Feb. 20, 1923.

J. W. MILLICAN.
COOKING UTENSIL.
FILED JAN. 24, 1922.

1,445,788.

Inventor
J. W. Millican,
By
Attorney

Patented Feb. 20, 1923.

1,445,788

UNITED STATES PATENT OFFICE.

JOEL WALTER MILLICAN, OF FORT WORTH, TEXAS.

COOKING UTENSIL.

Application filed January 24, 1922. Serial No. 531,472.

*To all whom it may concern:*

Be it known that I, JOEL W. MILLICAN, a citizen of the United States, residing at Fort Worth, in the county of Tarrant and State of Texas, have invented a new and useful Cooking Utensil, of which the following is a specification.

This invention has reference to domestic cooking vessels, and more particularly to vessels of this character designed for use as boilers.

The primary object of the invention is to provide means for trapping the steam arising from within the boiler, condensing the same and returning the condensation to the boiler.

Another object of the invention is to provide valve members for permitting fluid to enter the inner vessel of the boiler from the bottom thereof, but prevent fluid from passing from the inner receptacle, at the bottom thereof, to insure circulation of the fluid within the receptacle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
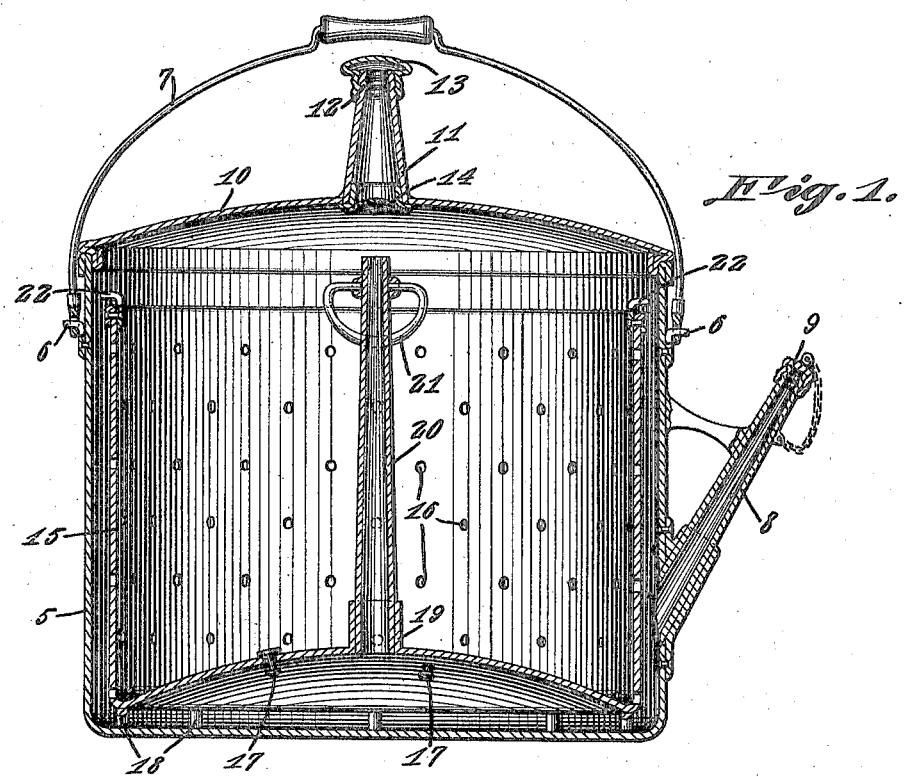
Figure 1 is a sectional view through a cooking vessel constructed in accordance with the present invention.
Figure 2:
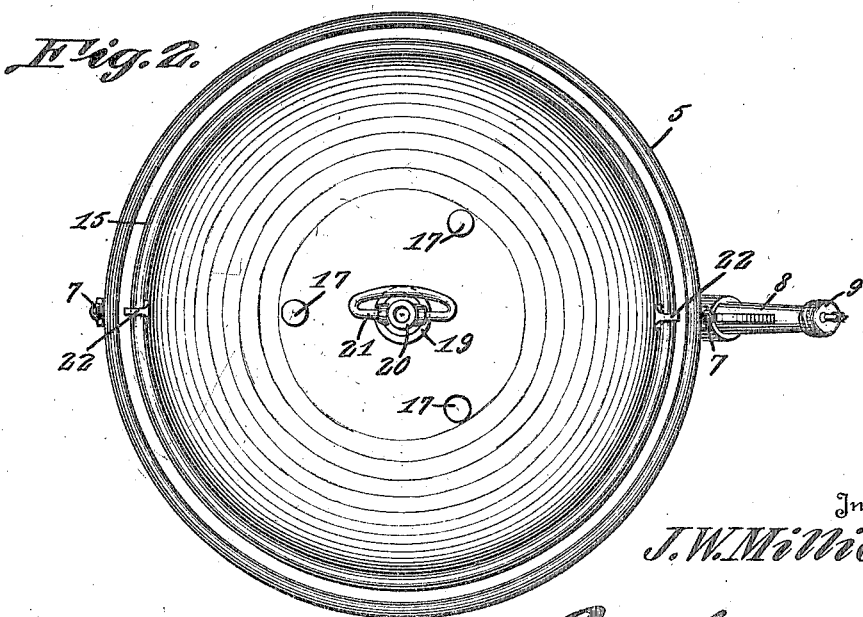
Figure 2 is a plan view thereof with cover removed.

Referring to the drawing in detail, the vessel includes an outer receptacle indicated generally by the reference character 5 and is formed with lugs 6 which extend laterally therefrom, and accommodate the ends of the bail 7 by which the vessel may be lifted and moved from place to place.

A spout indicated at 8 has communication with the interior of the outer receptacle 5, at a point adjacent to the bottom thereof, whereby the water within the receptacle may be poured therefrom. In order that steam generated within the receptacle may be prevented from passing from the spout 8, a cap 9 is provided, which is threaded to be positioned on the threaded extremity of the spout.

A closure indicated at 10 closes the upper portion of the main receptacle 5, and as shown, this closure is formed with a spout 11 which is also provided with a threaded portion 12 to accommodate the cap 13, so that the steam may be held within the receptacle, at the will of the person using the same. Disposed at the base of the spout 11, is a removable straining element 14 embodying fine wire mesh material, for retarding movement of the steam to cause the same to condense and fall back into the inner receptacle.

This inner receptacle is of a diameter less than the diameter of the main receptacle to provide a passageway between the receptacles, the inner receptacle being indicated at 15. Openings 16 are formed in the wall of the inner receptacle and establish communication between the passageway surrounding the inner receptacle, and the interior of the inner receptacle permitting a free circulation of water through the openings.

The bottom of the inner receptacle 15 is curved inwardly as clearly shown by Figure 1 of the drawing, to provide a compartment for trapping a small quantity of water. Valve members 17 control the passage of fluid through the compartment, and into the inner receptacle, the valve members being constructed to prevent water from passing from the inner receptacle to the compartment.

The inner receptacle 15 is supported in spaced relation with the bottom of the main receptacle 5, as by means of the supporting legs 18 so that the water within the inner receptacle, may circulate under the inner receptacle and through the compartment. Formed substantially centrally of the bottom of the inner receptacle, are the upstanding flanges 19 which accommodate the lower end of the tube 20, the tube tapering towards the upper end of the receptacle, and terminating at a point directly under the spout 11 to direct steam to the straining element 14.

A handle 21 has connection with the tube 20 and provides means for removing the tube, should it be desired to remove the inner receptacle. Lugs 22 are secured at the upper end of the inner receptacle, and may receive the ends of the bail 7, whereby the inner receptacle may be removed and the fluid therein drained off.

It might be further stated that in the use of the vessel, when articles have been cooked in the inner receptacle, and the inner receptacle has been removed, the closure or cover 10 may be inverted and positioned in the outer receptacle. With the cover in this position, the inner receptacle may be positioned thereon, to the end that the fluid in the inner receptacle may drain onto the cover and be delivered into the receptacle 5, through the spout 11.

Having thus described the invention what is claimed as new is:—

In a cooking vessel, an outer receptacle, an inner receptacle having an upwardly extended bottom portion providing a compartment with the bottom of the outer receptacle, supporting legs secured to the inner receptacle, and adapted to support the inner receptacle in spaced relation with the bottom of the outer receptacle, a tube extending upwardly from the bottom of the inner receptacle and in communication with the compartment, at the base thereof, said upwardly extended bottom of the inner receptacle having openings, valves disposed in the openings and adapted to permit fluid to pass from the compartment to the inner receptacle, and said valves adapted to prevent fluid from passing from the inner receptacle to the compartment.

In testimony that I claim the foregoing as my own, I have hereto affixed my signature in the presence of two witnesses.

JOEL WALTER MILLICAN.

Witnesses:
 JOHN F. NEAL,
 F. M. SMITH.